United States Patent
Thomas et al.

(10) Patent No.: US 8,041,869 B2
(45) Date of Patent: Oct. 18, 2011

(54) METHOD AND SYSTEM FOR BUS ARBITRATION

(75) Inventors: Bijo Thomas, Kottayam (IN); Milind Manohar Kulkarni, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/817,812

(22) Filed: Jun. 17, 2010

(65) Prior Publication Data
US 2010/0257296 A1    Oct. 7, 2010

Related U.S. Application Data

(63) Continuation of application No. 12/066,673, filed on Mar. 13, 2008, now Pat. No. 7,765,350.

(30) Foreign Application Priority Data

Sep. 14, 2005    (EP) .................................... 05108430

(51) Int. Cl.
G06F 13/36    (2006.01)
G06F 13/362    (2006.01)
G06F 13/368    (2006.01)
G06F 13/372    (2006.01)

(52) U.S. Cl. ........ 710/113; 710/116; 710/119; 710/123; 710/125; 710/309

(58) Field of Classification Search .................. 710/113, 710/116, 119, 123, 125, 309
See application file for complete search history.

(56) References Cited

U.S. PATENT DOCUMENTS

| | | | |
|---|---|---|---|
| 4,908,749 A | 3/1990 | Marshall et al. | |
| 5,025,370 A * | 6/1991 | Koegel et al. | 710/241 |
| 5,446,845 A | 8/1995 | Arroyo et al. | |
| 5,881,247 A | 3/1999 | Dombrosky et al. | |
| 5,901,332 A | 5/1999 | Gephardt et al. | |
| 5,913,044 A * | 6/1999 | Tran et al. | 710/107 |
| 5,930,484 A | 7/1999 | Tran et al. | |
| 6,366,984 B1 | 4/2002 | Carmean et al. | |
| 6,948,016 B2 | 9/2005 | Cedar et al. | |
| 2001/0007119 A1 | 7/2001 | Katayama et al. | |

FOREIGN PATENT DOCUMENTS

| | | |
|---|---|---|
| EP | 0188828 A2 | 7/1986 |
| EP | 0465320 A2 | 1/1992 |
| WO | 2005048115 A2 | 5/2005 |

OTHER PUBLICATIONS

"Date Packer"—Undated 4 Page Article Downloaded From IP.COM.
Written Opinion of The International Searching Authority For International Application No. PCT/IB2006/053148.

* cited by examiner

*Primary Examiner* — Mark Rinehart
*Assistant Examiner* — Jeremy S Cerullo

(57) ABSTRACT

A method and system for bus arbitration to be used in a system having a plurality of data handling units (110a, . . . , 110d) and a shared bus (140) with a plurality of data-lines. The invention provides a method and an system to carry out the method, having steps of; receiving data transfer requests from the data handling units; selecting a set of data transfer requests the allowance of which serves a maximum number of data handling units and utilizes a maximum number of data-lines, and; allowing the data handling units that issued said selected set of data transfer requests to access said bus in a single bus cycle.

9 Claims, 4 Drawing Sheets

METHOD AND SYSTEM FOR BUS ARBITRATION

Figure 1:
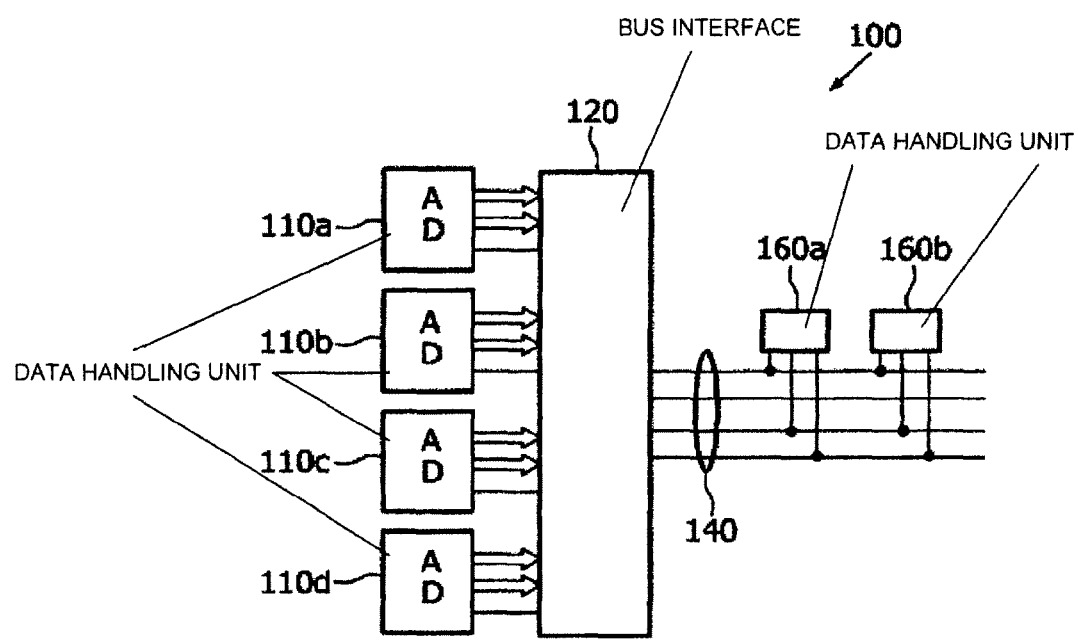

This is a continuation of prior application Ser. No. 12/066,673 filed Mar. 13, 2008 and is incorporated by reference herein.

The invention relates to a method and a system for bus arbitration, more particularly it relates to a bus arbitration system for a system having multiple data-handling units. Even more particularly, the invention relates to a bus arbitration system for a system having multiple data-handling units, the bus arbitration allowing optimal use of bus width and serving optimal number of data handling units.

Definition 1: In subsequent description the term "data-handling unit" will include any unit that may have access to the bus, such as memories, and processors. The units may be programmable, e.g. a general purpose processor, or have a predetermined function. The data-handling unit without excluding other possible data-handling units also will include processor/s. Hereinafter, the term "data-handling unit" may be interchangeably used to replace the word "processor".

Definition 2: In subsequent description the term "data-lines" includes any line that is used for communicating any data, including addresses. However, when reference is made to only "address lines" it will be mentioned categorically as "address lines". Hereinafter the "data-line/s" may be interchangeably used with the word "data bus or bus".

An address/data bus is a well-known solution for allowing multiple data-handling units to get access to shared resources such as memories. Conventionally, one data-handling unit at a time gets access to the bus to transfer data and corresponding address via the bus.

Modern data busses are very wide and permit words with many bits (e.g. 64 or 128 bits) to be transferred via the bus in a single bus cycle. Data handling circuits (like processors) do not always use all these data lines because, often the size of a word that has to be communicated is smaller than the word-size of the available bus width.

U.S. Pat. No. 6,366,984 discloses a packing mechanism of bits on the data bus by identifying addresses adjacent to each other. Similarly EP 465,320 discloses a write packer that collects write requests and compares the addresses from the requests to determine whether data from different requests can be packed into a single bus cycle.

Further, U.S. Pat. No. 5,930,484 discusses a mechanism for allowing bus access to multiple data handling units according to predetermined priorities of each data handling unit. Furthermore this mechanism divides the data bus into sub-buses, and identifies a maximum number of sub-buses that can be granted to a data-handling unit and assigns one or more sub-buses to one or more data-handling units accordingly. The mechanism disclosed in this patent relies on identified priorities and therefore may result in a non-optimal use of available bus width. Further in the depicted embodiment the shared bus is divided into sub-buses each having a 64-bit sub-bus width.

Assume that the system according to U.S. Pat. No. 5,930,484 has two processors namely, P1 and P2, such that processor P1 has a higher priority than processor P2. Maximum 2 sub-buses are assigned for each processor and there are four sub-buses each being 16-bit wide. For this system, there may exist a situation when processor P1 requests for a 48-bit data transfer and processor P2 requests for 16-bit data transfer. Then the method described in U.S. Pat. No. 5,930,484, will require at least two bus cycles to communicate this requests. In the first bus cycle 32-bit data of processor P1 and 16-bit data of P2 utilize only 48-bit lines. In the second bus cycle the remaining 16-bit data of processor P1 are forwarded. Therefore, it requires at least two bus cycles to transfer data while keeping available unutilized sub-buses.

Furthermore, the invention described in U.S. Pat. No. 5,930,484 may leave many more data lines unutilized when the size of a sub-bus is higher than the size of the requested data transfer. For example, if a bus of 128 data lines is divided into four sub-buses of 32-bit lines each, then a sub-bus will leave 16-bit lines unutilized for each data transfer request of 16-bit, resulting in a slow data transfer.

It is clear that the mechanism known from U.S. Pat. No. 5,930,484 and other cited patents do not offer any mechanism that optimizes the utilization of resources, although it tries to maximize the number of processors (clients/data-handling units) served.

Amongst others it is an object of the invention to provide a method and system for bus arbitration that not only maximizes the number of clients served in a single bus cycle but also optimally utilizes available resources.

To this end this invention provides a bus arbitrator arranged for receiving data transfer requests from a plurality of data handling units and for arbitrating access of the data lines of a shared bus amongst said plurality of data handling units comprising:

a. a logic block configured for allowing one or more data handling units to access said data bus for executing data transfer requests in a single bus cycle, wherein said logic block includes an optimizer, having as an optimization criterion, the maximization of the number of data handling units accessing and the maximization of the number of utilized data-lines in a single bus cycle, and;

b. a controller capable of registering and maintaining a schedule of pending data transfer requests for initiating a first optimization amongst a set of identified pending data transfer requests for allowing one or more pending data transfer requests for accessing said bus in a single bus cycle, wherein said controller is further configured for initiating a second optimization amongst data transfer requests other than said identified requests wherein access to unutilized data line is arbitrated after said first optimization.

The logic block receives the data transfer requests and determines the number of data-lines required for executing received data transfer requests. Logic block identifies,—according to the total number of data-lines and total number of data transfer requests—a set of data transfer requests that may be allowed for accessing the data-lines in a single bus cycle, such that the total number of requests allowed to access the data-line is maximum and the total number of data lines used in said bus cycle is maximum.

Further the controller registers the data transfer requests that have not yet been allowed to access the data-lines. Furthermore the controller also maintains a schedule so as to ensure that each data transfer requests is served in a predetermined time. In addition the controller, identifies whether one or more data transfer requests are pending for more than said predetermined time. In that case the controller instructs the logic block to allow access to identified data transfer requests and it also instructs the logic block to allow access to a set of data transfer requests other than the identified data transfer requests if there still exist any unutilized data-line.

According to an aspect of the invention a method of bus arbitration is provided for use in a system having a plurality of data handling units and a shared bus with a plurality of data-lines, comprising the steps of:

a. receiving data transfer requests from the data handling units;

b. selecting a set of one or more data transfer requests, the allowance of which serves a maximum number of data handling units and utilizes a maximum number of data-lines, and;
c. allowing the data handling units that issued said selected set of data transfer requests to access said bus in a single bus cycle.

This aspect of the invention provides for a maximization of the number of clients served in a single bus cycle in addition to an optimal utilization of available resources.

According to another aspect, the invention provides a method further comprising the steps of:
a. identifying data transfer requests having been pending for more than a predetermined duration, and;
b. selecting a first set of one or more data transfer requests amongst said identified data transfer requests the allowance of which serves a maximum number of data handling units and utilizes a maximum number of data-lines.

This aspect of the invention ensures a data transfer request is allowed to access the resources within an identified duration. The duration may be identified as a duration before which a data transfer request has to be allowed. This aspect of the invention allows to select a set of data transfer requests amongst the data transfer requests that are identified as pending for more than a predetermined duration, and said set serves a maximum number of data handling units and utilizes a maximum number of data-lines.

According to a further aspect of the invention the method comprises the steps of:
a. determining whether data lines are unutilized after selecting said first set of data transfer requests;
b. selecting a second set of one or more data transfer requests amongst data transfer requests other than said identified data transfer requests, the allowance of which serves a maximum number of data handling units and utilizes a maximum number of determined unutilized data-lines, and;
c. allowing the data handling units that issued said first and second set of data transfer request to access said bus in a single bus cycle.

This aspect of the invention allows for determining unutilized data lines after a first set of data transfer requests has been selected. For example, if there exist a set of data transfer requests that are pending longer than a predetermined duration, than a first round of selection will be made amongst data transfer requests that are pending for more than said predetermined duration. After said first set is selected, such that a maximum number of data handling units are served and maximum resources are utilized, and still one or more data lines may be unutilized. In that case, a second set is selected for remaining data lines amongst the data transfer requests other than said identified data transfer requests for ensuring maximum utilization of the available resources.

According to yet a further aspect of the invention the step of allowing the data-handling units includes the step of registering and scheduling each received and served request. This aspect of the invention allows a mechanism to maintain a time log of each data transfer request that may be used to determine if any data transfer request is pending for more than a predetermined duration. Accordingly, it can be ensured that the pending request is served within a given duration.

According to another aspect of the invention the step of identifying includes a step of determining of a duration within which a data transfer request has to be allowed access to said bus. This aspect of the invention provides a flexibility to program a time duration within which a data transfer request may be expected to be served.

According to yet another aspect of the invention the step of selecting optionally provides a step of selecting a set of data transfer requests that includes a relatively high number of old data requests amongst a plurality of sets of requests the allowance of which serves a maximum number of data handling units and causes utilization of a maximum number of data-lines. This aspect of the invention provides a flexibility to chose one set of data transfer request that may be allowed access, amongst a plurality of sets data transfer request that allowance of which result in servicing a same number of data handling units and same number of resources utilization.

Figure 2:
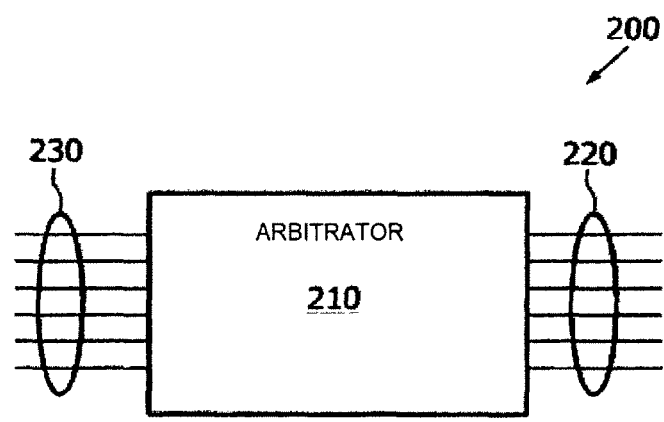
Figure 3:
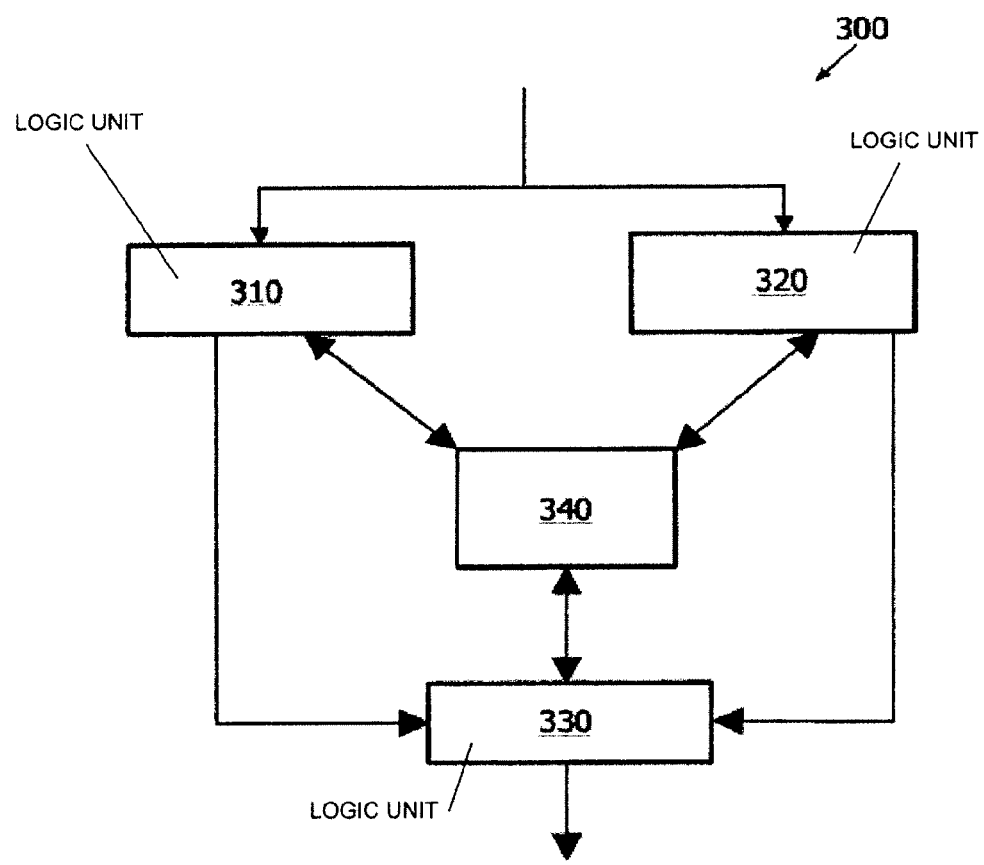
Figure 4:
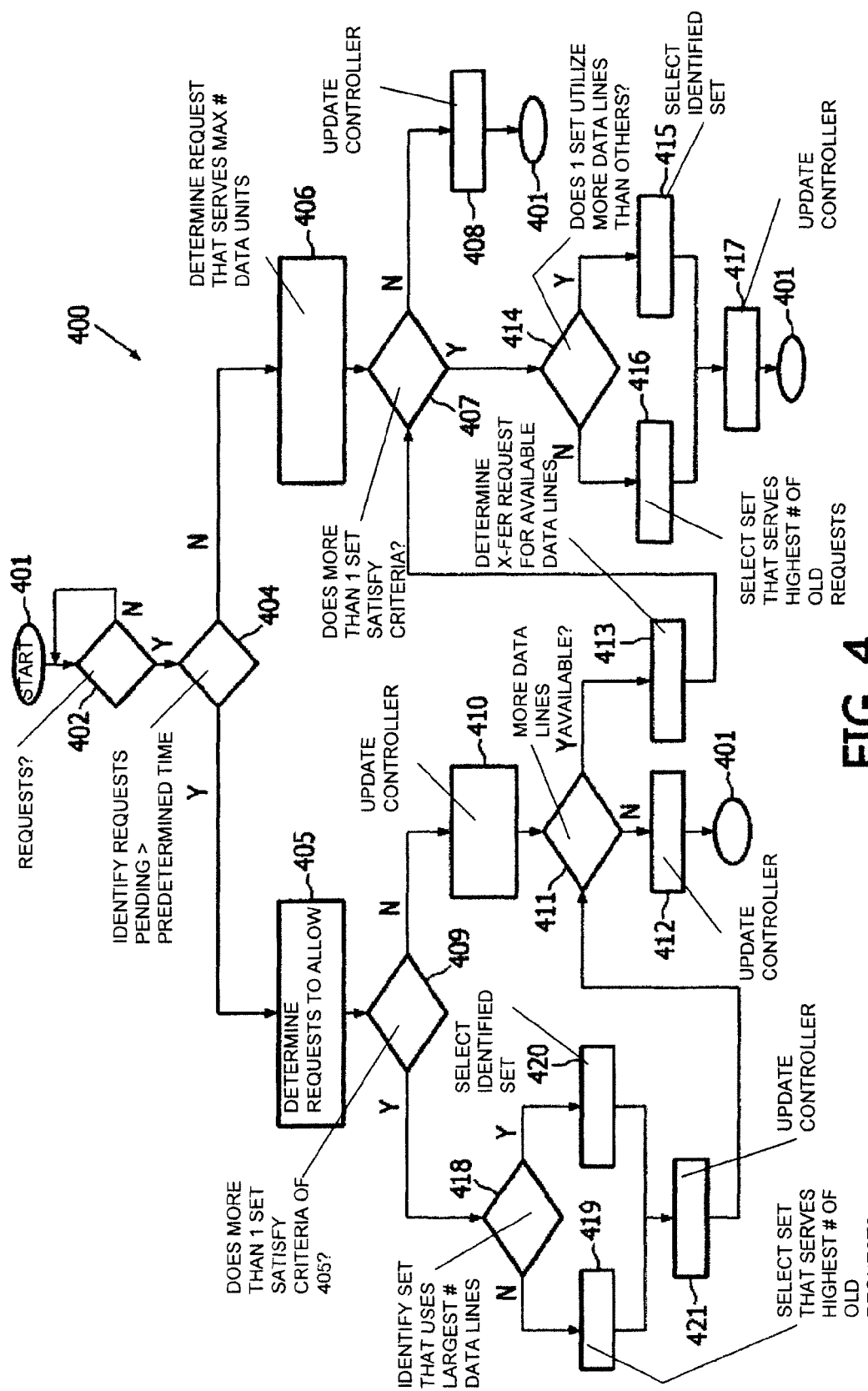
Figure 5:
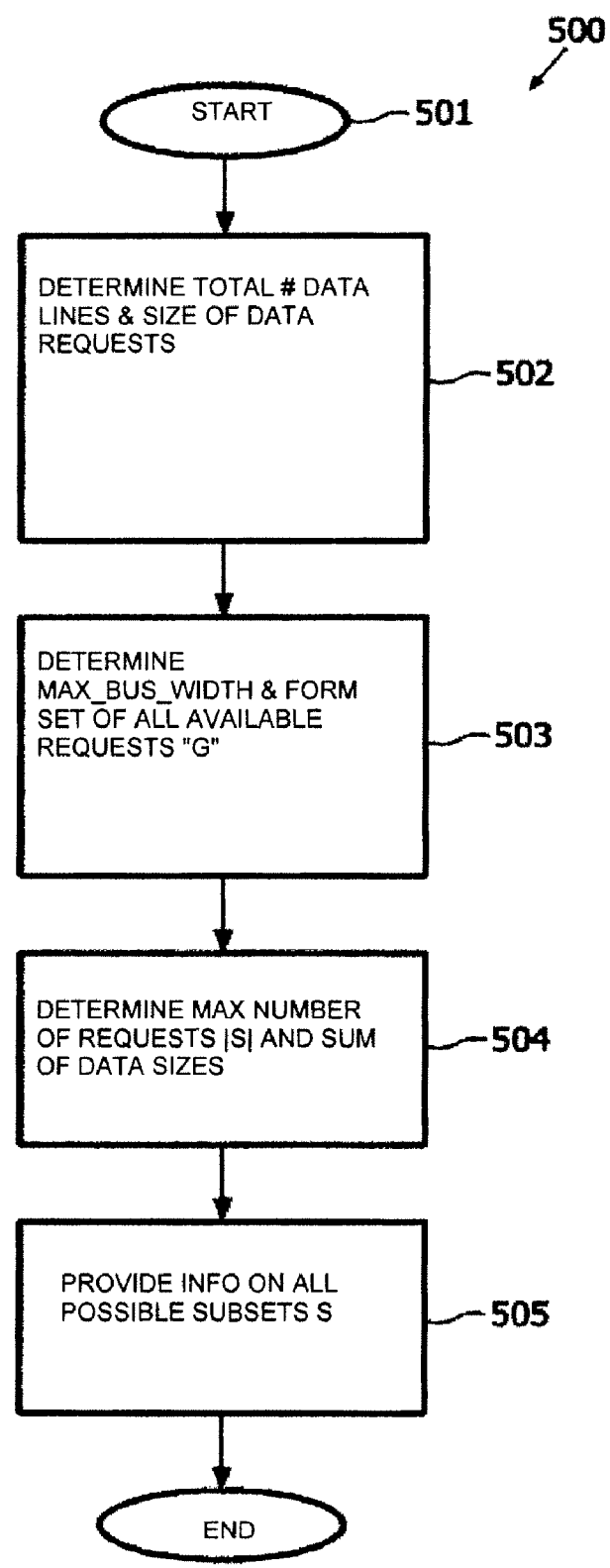

These and other aspects of the invention are described in more detail with reference to the drawing. Therein;

FIG. 1 illustrates an electronic circuit suitable for implementing the invention, FIG. 2 illustrates a block diagram of an embodiment of an arbitrator according to this invention, FIG. 3 illustrates a block diagram of an embodiment of a circuit forming part of the arbitrator according to this invention, FIG. 4 illustrates a flow diagram with the steps executed by the method for arbitration according to the invention, FIG. 5 illustrates a flow diagram with the steps executed when computing a possible set of requests that may be allowed to access data lines, according to the invention.

Reference is made to FIG. 1, wherein an electronic circuit is shown that may be used for implementing the present invention. In this example, for the purpose of illustration, data handling units are identified by processors and memories for clarity of understanding. However a person skilled in the art will appreciate that the processors or memories or both may be exchanged or replaced or rearranged with other set of data handling units, without departing from the basic concept of the invention.

The circuit 100 of FIG. 1 contains a plurality of processors or data handling units 110a-d, a bus interface 120, a bus 140 and a plurality of memories or another set of data handling unit 160a and b. Each processor 110a-d may have an address output A, data outputs D and control input/outputs. The control input/output may provide information to identify a processor and/or a word size of the data that is to be transferred and may also provide a size of the address. Bus interface 120 couples the address and data outputs to bus 140, to which memories 160a,b are coupled to receive address and data information. Bus 140 comprises a plurality of address lines, a plurality of data lines such as, 64 or 128 data lines and control lines.

For illustration, processors 110a-d are shown to have data outputs only, but it should be understood that processors may have data inputs, data inputs or a set of data outputs and data outputs coupled to bus interface 120. Although processors 110a-d are shown in the FIG. 1, it should be understood that any other kind of data handling circuit may be used. Similarly, although two memories are shown connected to bus 140 for the sake of illustration, it will be understood that many other circuits may be connected to bus 140, not necessarily all memories, or that only a single circuit may be connected to bus 140.

In operation, processors 110a-d produce data and write this data to locations in memories 160a-b, or read data from the memory 160a, . . . , d. For this purpose, processors 110a-d generate read/write requests and provide inputs to the bus interface 120. The input to the bus interface may be data and address or address only. Bus interface 120 operates in bus cycles. In each bus cycle, bus interface 120 selectively passes data/address bits to the data/address lines of bus 140. Memories 160a-b receive the addresses from bus 140, and use them to select locations where the data is written. The interface 120 according to the invention arbitrates amongst data transfer requests, to sequence data and addresses from/to different processors 110a-d. The interface 120 has a controller for releasing data and addresses on the bus.

Reference is now made to FIG. 2, which shows a block diagram 200 of an arbitrator 210 within bus interface 120, receiving a plurality of inputs 230 and providing a plurality of outputs 220. The arbitrator 210 may receive inputs that distinctly identify processors and data transfer requests made by said processors. Further the arbitrator 210 may also receive inputs, identifying size of data/address that is requested by the processors for communications. With its output 220, the arbitrator may enable release of identified data or addresses or both for communication by enabling the switches and/or processors within the bus interface 120 (FIG. 1) allowing data/address transfer.

Reference is now made to FIG. 3, which shows a block diagram 300 of a circuit within the arbitrator 210 of FIG. 2. Circuit 300 comprises logic units 310, 320 and 330. These logic units select a data transfer request or a set of requests for data transfer such that a maximum number of processors are allowed to access data-lines while also ensuring optimal utilization of data-lines. The block 300 is further provided with a controller 340 connected to logic unit 310, 320 and 330 for ensuring that given request/s are served within a predetermined time. Controller 340 may be programmable or have predetermined settings for the time duration within which a request should be essentially served. If it is programmable, it may be programmed during the course of executing instructions or may be programmed before executing instructions. The controller 340 also registers and dynamically updates pending request. A person skilled in the art will appreciate that functions of logic unit 310, 320 and 330 have the same function for selecting a set of data transfer request in different circumstances ("different circumstances" will be more clear in the sequel) and this functions can be carried out using only one logic unit by accordingly programming a single logic unit. Alternatively, the logic units 310, 320 and 330 may be packed in a single logic block. However for purpose of illustration, simplicity and clarity in this discussion these units are shown as separate blocks.

Operation of block 300 may be understood as follows. Both logic units 310 and 320 may receive inputs that uniquely identify processors and corresponding requests made by said processors. Further said logic units 310 and 320 may also receive inputs identifying a size of a data/address that is requested by each processor for communications. Logic unit 310 and logic unit 320 are further provided with information about a data-line width available for utilization. Logic unit 330 receives inputs from logic units 310, 320 and controller 340. The logic unit 330 provides a selected set of data transfer requests that may be finally allowed to access the data bus.

Initially, when no requests are present for data transfer, the controller 340 is set to indicate "no" request waiting. In this case controller disables logic unit 320 and sets logic unit 330 to act as a transparent block. On receipt of data transfer requests, logic unit 310 computes all possible set of data transfer requests, that may be allowed to access data-lines, and which would serve maximum number of requests. In case, if there are more than one such sets possible that would serve maximum number of requests then logic unit 310 selects a set of requests that would utilize highest number of data-line width enable access to data line for selected data transfer requests.

Further, if there is more than one set allowing service to the maximum number of data transfer requests and utilizing the maximum possible data-line width then, logic unit 310 may select a set that has a relatively high number of relatively old data transfer requests. Logic unit 310 then updates controller 340 regarding pending data-transfer requests.

In case when controller 340 determines that one or more data transfer requests are pending for more than a predetermined duration then, it enables logic unit 320 and logic unit 330 and sets logic unit 310 to pass available requests to logic unit 330. Logic unit 320 computes all possible sets of the data transfer requests amongst said identified pending requests and selects possible sets exactly in a similar manner as logic unit 310 in the previous case. On completion of the computation logic unit 320 provides its output to logic unit 330. After logic unit 320 selects a set of data transfer requests, logic unit 330 checks whether there are any more data lines available that can be used for communication. If so then, logic unit 330 carries out a computation, in the similar manner as discussed for logic unit 310, for requests other than identified requests that can be allowed access via available data lines.

While computing the possible set of data transfer requests that may be allowed to access the data lines, the logic units 310, 320 and 330 may be programmed to include size of data-addresses and send a signal to allow access to data as well as address lines, in a given bus (data-line) cycle, or on the other hand the addresses of the data may be communicated on a separately identified address communication line serially.

In order to compute possible combinations of data transfer requests logic units 310, 320 and 330 may use the following formula.

Select subset S of set G, such that;

|S| is max and

Sum of data-sizes of elements of S<=Max_Bus_Width

Wherein, G is a set of all available requests. S is a set of requests and a subset of G and corresponds to one of the possible set of requests that may be allowed to access the datelines. |S| is the number of requests in subset S, and Max_Bus_width is the maximum number of available data-lines. As discussed earlier if there exists more than one subset S, for which |S| is the same, then logic units may select the subset that would utilize the highest number of data-lines and send control signals at the output of block 300 to enable access to data line for selected data transfer requests. Further, if there is more than one set allowing service to the maximum number of data transfer requests and utilizing the maximum possible number of data-lines then, logic units 310, 320, 330 may select a set that has a relatively high number of relatively old data transfer requests. Each logic unit updates controller 340 at the end of selection process.

It is clear from above discussion that logic units 310, 320, 330 are functional for "different circumstances", namely; logic unit 310 selects a set of data transfer requests when there is no identified pending request, logic unit 320 selects a set of data transfer requests amongst identified pending request, and logic unit 330 selects another set of data transfer requests for other then identified data transfer request for only unutilized data lines after logic unit 320 has selected a set of identified pending request leaving one or more data-lines unutilized.

Reference is now made to FIG. 4, which gives the high-level logic flowchart 400 illustrating the control sequence for the bus arbitration scheme according the method and system of the present invention. As depicted this process starts at block 401 and then passes on to the block 402. Block 402 checks if there are any requests to be serviced. If there are requests available, then the control moves on to block 404. If not, checking for requests in block 402 iterates till the next bus request is available.

In block 404, a check is carried out to identify requests which are pending for more than a pre-determined duration.

The controller 340 (shown in FIG. 3) performs this identification. If controller 340 identifies that certain requests are pending for a duration longer than the pre-determined duration, then control is passed on to the block 405.

In block 405, a computation is carried out to determine a set of requests that should be allowed in order to serve the maximum number of data-handling units amongst the requests identified by the controller 340. After block 405 control is passed on to block 409, which checks whether more than one set satisfy the criteria in 405. If so, the control moves on to block 418.

Block 418 carries out a check for identifying the set, the allowance of which achieves utilization of the highest number of data-lines. If there is a single set that achieves more utilization, then control block 420 selects that set, and provides output signals and control block 421 updates controller 340. Returning back to block 418, if multiple sets equally satisfy the criteria, then control block 419 selects any set that serves the highest number of relatively old requests—the timing details being identified by controller 340—and block 421 updates the controller 340, The control is then is passed onto block 411.

In block 411 it is verified if the allowance of the selected set results in an occupation of all data-lines in the system. If still one or more data-lines are available for communication, then control moves on to block 413.

In block 413, a set of data transfer requests other than identified pending requests are determined and a set of data transfer requests is determined amongst said request for communicating through unutilized data-lines. The selection of a set data transfer requests is made such that it serves a maximum number of data handling units and utilizes a maximum number of available-data lines.

Control is then passed to block 407. This block identifies whether more than one set satisfies above criterion. In that case control moves on to block 414, wherein a check is performed to ensure if the allowance of only one of the sets achieves more data-line utilization than the allowance of each of the other sets. If so, the set utilizing the maximum number of data lines is selected. The block 417 updates controller 340 and then passes control to start block 401. Returning back to block 414, if multiple sets equally satisfy the criteria, then control block 416 selects any set that serves the highest number of relatively older requests; the timing details being identified by controller 340. Block 416 provides output signals and then block 417 updates details of served and pending requests in controller 340 and then control passes onto the start block 401.

Returning back to block 411, if the check determines that there are no remaining available data-lines, then control moves on to block 412. This block provides a selected set of requests to be served and updates details of served and pending requests to the controller 340. Subsequently control is passed to start block 401.

Returning back to block 407, if there is only one set that satisfies the said criteria, then control moves on to block 408 which selects that the only set and updates details of served and pending requests to controller 340. Finally control is returned back to start block 401.

Returning back to block 409, if only one set satisfies the said criteria, then the control moves to block 410 that selects that set and updates details of served and pending requests to controller 340. Now a check is performed in block 411 to see if the selected set in block 410 occupies all data-lines (or the total bus) in the system. If so, the control moves on to block 413 and the control flow from block 413 is as explained previously. If not, then in block 412 said set is selected and details of served and pending requests are updated in controller 340. The block 412 passes control to start block 401.

Returning back to block 404, if controller 340 has not identified requests, which are pending, longer than the pre-determined duration, the control passes to block 406. In block 406, a computation is carried out to determine the set of requests the allowance of which serves the maximum number of data-handling units. After block 406 control is passed to block 407, which checks whether more than one sets satisfy the criteria in 406. If so, the control moves on to block 414 and the control moves from block 414 as mentioned previously. If not, the control moves onto block 408 wherein that set is selected, and details regarding served and pending requests are updated to the controller 340. Finally control is passed to the start block 401.

Reference is now made to FIG. 5. FIG. 5 describes the steps of determining the set of requests amongst all available requests including those requests identified by controller 340. As depicted this process starts at block 501 and passes on to the block 502. In block 502, information indicative for the total number of available data lines, the number of data transfer requests, and the size of the data requested for transfer by each request is received and control is transferred to block 503, wherein the parameter Max_Bus_Width is set to the captured value of total number of data lines available. Additionally, block 503 forms the set of all available requests G based on available requests. This information is passed on to the block 504. In block 504, a computation is carried out to find out the possible subsets S from set G, according to following criteria:

1. |S| is maximum, wherein |S| is the number of requests in subset S
2. Sum of data-sizes of elements of S<=Max_Bus_Width Block 505 provides the information about all the possible subsets S and control flow ends for this process.

Now reference is made to Table 1, which illustrates an example for the arbitration scheme according to the present invention, for use in a system having a shared bus, a plurality of data handling unit (Processor) and arbitrator receiving inputs from said processors for arbitrating access of said shared bus. In this example the shared bus size is 64 and there are 4 or more processors accessing this bus. Assuming that each processor may makes a 16-bit, or 32-bit, or 64-bit data transfer request and assuming that the controller indicates no requests pending for more than the predetermined duration. Then, Table 1 describes the number of requests served and bus-width utilization for a set of requests according to the present invention. For the purpose of illustration each row in Table 1 lists the sizes (in bits) of the available requests at a particular instance of time, the number of requests served and the bus-width utilization. The entry 'X' indicates the presence of zero or more number of the requests.

Consider the Row 1. This corresponds to a scenario wherein there are four or more requests with word-size 16. In addition, there can also be multiple 32-bit and 64-bit requests available simultaneously. Considering the data bus-width of 64-bit, the arbiter chooses to grant the bus to four 16-bit requests, regardless the number of requests for a 32-bits or a 64-bit transfer. Namely said choice both maximizes the number of processors served and the data bus-width utilization. The entry 4 is shown as shaded entry as an indication that this request is selected by the arbitration policy. The different rows indicate the various scenarios of request types for 64-bit data bus and 16, 32, 64-bit request sizes. This serves as an example to illustrate the proposed arbitration policy and doesn't limit the scope of the invention.

TABLE 1

| Sl. No | Size of requests | | | No. of requests served | Bus-width Utilization |
|---|---|---|---|---|---|
| | 16-bit | 32-bit | 64-bit | | |
| 1 | 4 | X | X | 4 | 64 |
| 2 | 2 | 1 | X | 3 | 64 |
| 3 | 3 | 0 | X | 3 | 48 |
| 4 | <=1 | 2 | X | 2 | 64 |
| 5 | 1 | 1 | X | 2 | 48 |
| 6 | 2 | 0 | X | 2 | 32 |
| 7 | 0 | <=1 | 1 | 1 | 64 |
| 8 | 0 | 1 | 0 | 1 | 32 |
| 9 | 1 | 0 | 0 | 1 | 16 |

The order in the described embodiments of the methods and systems of the current invention is not mandatory, and is illustrative only. The scope of the invention is not limited to the described embodiments. A person skilled in the art may change the order of steps or perform steps concurrently using threading models, multi-processor systems or multiple processes without departing from the concept as intended by the current invention. Any such embodiment will fall under the scope of the invention and is a subject matter of protection.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a set of these measures cannot be used to advantage.

The invention claimed is:

1. A method of bus arbitration comprising the acts of:
   providing a system having a plurality of data handling units and a shared bus with a plurality of data-lines, there being sufficient number of data-lines to allow multiple data handling units to simultaneously access different data-lines of the shared bus during a single bus cycle, and there being more data units than a minimum number of data units that could simultaneously access all the data-lines of the shared buss in a single cycle;
   receiving data transfer requests from the data handling units;
   selecting one or more first sets of one or more data transfer requests, which first sets each serves a same maximum number of data handling units in a single bus cycle, and
   selecting from the one or more first sets, a single second set which utilizes a maximum number of data-lines in the single bus cycle, and
   allowing the data handling units that issued said selected second set of data transfer requests to access said bus in a single bus cycle.

2. The method for bus arbitration as claimed in claim 1, wherein the act of allowing the data handling units includes an act of registering and scheduling of each received and served request.

3. A bus arbitrator comprising:
   a receiver for receiving data transfer requests from a plurality of data handling units, and wherein the arbitrator arbitrates access to the data lines of a shared bus amongst said plurality of data handling units, there being a sufficient number of data-lines to allow multiple data handling units to simultaneously access different data-lines of the shared bus during a single bus cycle, and there being more data units than a minimum number of data units that could simultaneously access all the data-lines of the shared buss in a single cycle;
   logic means for selecting one or more first sets of one or more data transfer requests, the allowance of which first sets each serves a same maximum number of data handling units, in a single bus cycle, and for selecting from the one or more first sets, a single second set which utilizes a maximum number of data-lines, in a single bus cycle; and
   a controller for registering and maintaining a schedule of pending data transfer requests and for allowing the data handling units that issued said selected second set of data transfer requests to access said bus in a single bus cycle.

4. A method of bus arbitration comprising the acts of
   providing a system having a plurality of data handling units and a shared bus with a plurality of data-lines, there being a sufficient number of data-lines to allow multiple data handling units to simultaneously access different data-lines of the shared bus during a single bus cycle, and there being more data units than a minimum number of data units that could simultaneously access all the data-lines of the shared buss in a single cycle;
   selecting one or more first sets of one or more data transfer requests, which first sets each meet a predetermined age criteria in a single bus cycle, and
   selecting from the one or more first sets, one or more second sets of one or more data transfer requests, which second sets each serves a same maximum number of data handling units in a single bus cycle, and
   selecting from the one or more second sets, a single third set which utilizes a maximum number of data-lines in a single bus cycle, and
   allowing the data handling units that issued said selected third set of data transfer requests to access said bus in a single bus cycle.

5. The method of bus arbitration of claim 4, wherein the predetermined age criteria met by the one or more first sets is the serving a same maximum number of data transfer requests having been pending for more than a predetermined duration.

6. A bus arbitrator comprising:
   a receiver for receiving data transfer requests from a plurality of data handling units, and wherein the arbitrator arbitrates access to the data lines of a shared bus amongst said plurality of data handling units, there being a sufficient number of data-lines to allow multiple data handling units to simultaneously access different data-lines of the shared bus during a single bus cycle, and there being more data units than a minimum number of data units that could simultaneously access all the data-lines of the shared buss in a single cycle;

logic means for selecting one or more first sets of one or more data transfer requests, which first sets each meet a predetermined age criteria in a single bus cycle, and for selecting from the one or more first sets, one or more second sets of one or more data transfer requests, which second sets each serves a same maximum number of data handling units in a single bus cycle, and for selecting from the one or more second sets, a single third set which utilizes a maximum number of data-lines in a single bus cycle, and;

a controller for registering and maintaining a schedule of pending data transfer requests and for allowing the data handling units that issued said selected third set of data transfer requests to access said bus in a single bus cycle.

7. The bus arbitrator of claim 6, wherein the predetermined age criteria met by the one or more first sets is the serving a same maximum number of data transfer requests having been pending for more than a predetermined duration.

8. A method of bus arbitration comprising the acts of:

providing a system having a plurality of data handling units and a shared bus with a plurality of data-lines, there being a sufficient number of data-lines to allow multiple data handling units to simultaneously access different data-lines of the shared bus during a single bus cycle, and there being more data units than a minimum number of data units that could simultaneously access all the data-lines of the shared buss in a single cycle, receiving data transfer requests from the data handling units;

selecting one or more first sets of one or more data transfer requests, which first sets each serves a same maximum number of data transfer requests, in a single bus cycle, and selecting from the one or more first sets, one or more second sets which serves a maximum number of data handling units, in a single bus cycle, selecting from the one or more second sets, a single third set, which third set meets a predetermined age criteria, and allowing the data handling units that issued said selected third set of data transfer requests to access said bus in a single bus cycle.

9. A bus arbitrator comprising:

a receiver for receiving data transfer requests from a plurality of data handling units, and wherein the arbitrator arbitrates access to the data lines of a shared bus amongst said plurality of data handling units, there being a sufficient number of data-lines to allow multiple data handling units to simultaneously access different data-lines of the shared bus during a single bus cycle, and there being more data units than a minimum number of data units that could simultaneously access all the data-lines of the shared buss in a single cycle;

logic means for selecting one or more first sets of one or more data transfer requests, which first sets each serves a same maximum number of data transfer requests, in a single bus cycle, and selecting from the one or more first sets, one or more second sets which serves a maximum number of data handling units, in a single bus cycle, and selecting from the one or more second sets, a third set, which third set meets a predetermined age criteria and;

a controller for registering and maintaining a schedule of pending data transfer requests and for allowing the data handling units that issued said selected third set of data transfer requests to access said bus in a single bus cycle.

* * * * *